(12) United States Patent
Sugatani et al.

(10) Patent No.: US 10,619,887 B2
(45) Date of Patent: Apr. 14, 2020

(54) INSTANTANEOUS HOT WATER CIRCULATION UNIT WITH SCALE CLEANING FUNCTION

(71) Applicant: NORITZ CORPORATION, Hyogo (JP)

(72) Inventors: Masaki Sugatani, Akashi (JP); Yu Fujimoto, Kakogawa (JP); Tomofumi Kinugasa, Kobe (JP); Hiromi Yamanishi, Kako-gun (JP); Yoshihiro Nunotani, Kakogawa (JP)

(73) Assignee: NORITZ CORPORATION, Hyogo (JP)

( * ) Notice: Subject to any disclaimer, the term of this patent is extended or adjusted under 35 U.S.C. 154(b) by 144 days.

(21) Appl. No.: 15/896,065

(22) Filed: Feb. 14, 2018

(65) Prior Publication Data
US 2018/0238586 A1 Aug. 23, 2018

(30) Foreign Application Priority Data
Feb. 21, 2017 (JP) .................. 2017-030113

(51) Int. Cl.
*F22D 11/00* (2006.01)
*F24H 9/00* (2006.01)
(Continued)

(52) U.S. Cl.
CPC ............. *F24H 9/0042* (2013.01); *C02F 5/10* (2013.01); *E03B 7/045* (2013.01); *E03C 1/044* (2013.01);
(Continued)

(58) Field of Classification Search
CPC .......... F22B 35/005; F22B 29/02; F24H 1/10; F24H 1/207; F28G 15/02; F22D 11/006; F23J 3/04
See application file for complete search history.

(56) References Cited

U.S. PATENT DOCUMENTS 3,522,909 A * 8/1970 Arant ...................... B08B 3/026
239/127
7,163,619 B2 * 1/2007 Wang ........................ C02F 1/00
210/153
(Continued)

FOREIGN PATENT DOCUMENTS

JP       2000254658 A  * 9/2000
JP       2003-336899      11/2003
JP       2015-102323      6/2015

*Primary Examiner* — Gregory A Wilson
(74) *Attorney, Agent, or Firm* — JCIPRNET (57) ABSTRACT

Provided is an instantaneous hot water circulation unit with a scale cleaning function which can easily perform pipe cleaning for removing scale. The instantaneous hot water circulation unit which includes a hot water supply inlet portion connected to a hot water discharge unit of a hot water supply device, a hot water supply outlet portion connected to an external hot water supply unit, a hot water returning unit, a hot water outgoing unit, a hot water supply pipe, a hot water pipe, and a circulation pump, and a bypass pipe, which drives the circulation pump to perform an instantaneous hot water circulation operation when stoping hot water supply, wherein a storage tank configured to store a cleaning agent used in a cleaning operation of cleaning an inside of the pipe of the hot water supply device is provided at the bypass pipe.

8 Claims, 7 Drawing Sheets

(51) Int. Cl.
    *C02F 5/10*           (2006.01)
    *F24D 17/00*        (2006.01)
    *F28G 9/00*          (2006.01)
    *E03B 7/04*          (2006.01)
    *F24H 9/20*          (2006.01)
    *F24H 1/12*          (2006.01)
    *F24D 19/00*        (2006.01)
    *E03C 1/044*       (2006.01)

(52) U.S. Cl.
    CPC ..... *F24D 17/0078* (2013.01); *F24D 19/0092* (2013.01); *F24H 1/125* (2013.01); *F24H 9/2035* (2013.01); *F28G 9/00* (2013.01)

(56) References Cited

U.S. PATENT DOCUMENTS

| | | | | |
|---|---|---|---|---|
| 9,726,400 | B2* | 8/2017 | Mase | F24H 9/2035 |
| 10,168,047 | B2* | 1/2019 | Satoh | F24D 19/0095 |
| 2013/0075245 | A1* | 3/2013 | Frick | B01D 1/0047 |
| | | | | 203/22 |

* cited by examiner

INSTANTANEOUS HOT WATER CIRCULATION UNIT WITH SCALE CLEANING FUNCTION

CROSS-REFERENCE TO RELATED APPLICATION

This application claims the priority of Japan patent application serial no. 2017-030113, filed on Feb. 21, 2017. The entirety of the above-mentioned patent application is hereby incorporated by reference herein and made a part of this specification.

BACKGROUND

Technical Field

The disclosure relates to an instantaneous hot water circulation unit which is connected to a hot water supply device and forms an instantaneous hot water system, particularly, to an instantaneous hot-water circulation unit having a function of removing scale adhering inside a pipe forming an internal passage of the hot water supply device.

Description of Related Art

Conventionally, a hot water supply device which is configured to heat service water using combustion heat of fuel and to supply hot water from a hot water supply faucet have been widely used. Generally, in such a hot-water supply device, low temperature water comes out immediately after the hot water supply faucet is opened. Thereafter, it takes time according to a route between the hot water supply device and the hot water supply faucet until hot water at a hot water supply temperature comes out. To allow warm water to be supplied immediately after the hot water supply faucet is opened, for example, as disclosed in Patent Document 1, an instantaneous hot water supply system in which a circulation passage is formed between a hot water supply device and a hot water supply faucet, and hot water heated by the hot water supply device is circulated by a circulation pump provided in the circulation passage is known.

In an area in which hard water containing large amounts of minerals such as calcium is used as service water, precipitated minerals become scale and adhere inside a pipe of the hot water supply device, particularly inside a pipe of a heat exchanger for heating the service water. In an instantaneous hot water supply system, since a frequency of heating water is high, adhesion of the scale proceeds quickly. Since the adhered scale disturbs heat exchange, heating capacity of the hot water supply device is lowered, and the pipe may reach an abnormally high temperature or may be clogged, and thus the hot water supply device may be broken. Therefore, it is necessary to remove the scale periodically.

Meanwhile, as disclosed in Patent Document 2, a technique for detecting adhesion of scale to promote pipe cleaning and a technique for preventing breakage by prohibiting combustion in the hot water supply device when the adhesion of the scale is detected are known. An operator connects equipment for pipe cleaning to the hot water supply device and then performs the pipe cleaning for removing scale. For example, one ends of two hoses are connected to each of a water supply portion and a hot water discharge portion of the hot water supply device, the other end of each hose is placed in a water tank containing a cleaning agent, and a cleaning pump is driven to circulate the cleaning agent between the hot water supply device and the water tank to perform the pipe cleaning. At this time, isolation valves disposed in the water supply portion and the hot water discharge portion are operated so that the cleaning agent is not introduced into in an upstream side of the water supply portion in the hot water supply device or a downstream side of the hot water discharge portion therein. Such pipe cleaning is performed similarly in the hot water supply system.

[Patent Document 1] Japanese Unexamined Patent Application Publication No. 2003-336899

[Patent Document 2] Japanese Unexamined Patent Application Publication No. 2015-102323

However, since the pipe cleaning for removing scale requires many working processes and it is necessary to prepare equipment for pipe cleaning, a user of the hot water supply device cannot easily perform the pipe cleaning. Therefore, a professional worker is arranged to perform the pipe cleaning. Further, in the hot water supply device, since it is necessary to provide the isolation valve in each of the water supply portion and the hot water discharge portion for pipe cleaning, there is a problem that installation cost of the hot water supply device increases.

SUMMARY

An aspect of the disclosure is to provide an instantaneous hot water circulation unit with a scale cleaning function which can easily perform pipe cleaning for removing scale.

According to a first embodiment, there is provided an instantaneous hot water circulation unit which includes a hot water supply inlet portion connected to a hot water discharge unit of a hot water supply device, a hot water supply outlet portion connected to an external hot water supply unit, a hot water returning unit configured to introduce returning hot water from the hot water supply unit, a hot water outgoing unit connected to a water supply unit of the hot water supply device, a hot water supply pipe configured to connect the hot water supply inlet portion with the hot water supply outlet portion, a hot water pipe configured to connect the hot water returning unit with the hot water outgoing unit, and a circulation pump provided in the hot water supply pipe or the hot water pipe, and which drives the circulation pump to perform an instantaneous hot water circulation operation in which hot water heated by the hot water supply unit is circulated when the hot water supply unit stops hot water supply, and includes a bypass pipe configured to connect the hot water supply pipe and the hot water pipe, wherein a storage tank configured to store a cleaning agent used in a cleaning operation of cleaning an inside of the pipe of the hot water supply device is provided at the bypass pipe.

According to a second embodiment, in the first embodiment, a blocking unit configured to prevent the hot water from flowing through the bypass pipe in the instantaneous hot water circulation operation and to prevent the hot water from flowing through the hot water supply outlet portion and the hot water returning unit in the cleaning operation unit may be provided.

According to a third embodiment, in the first or second embodiment, a drain portion may be provided in the storage tank or the bypass pipe, and when the cleaning operation is completed, the hot water containing the cleaning agent may be discharged from the drain portion.

According to a fourth embodiment, in any one of the first to third embodiments, a controller configured to control the cleaning operation and a water amount detection unit configured to detect a hot water supply usage amount may be included, and the controller may automatically start the cleaning operation when a period during which the cleaning operation is not performed exceeds a preset period or when an accumulated amount of the hot water supply usage amount detected by the water amount detection unit exceeds a preset accumulated amount.

DESCRIPTION OF THE EMBODIMENTS

Hereinafter, configurations for performing the disclosure will be described on the basis of embodiments.

Embodiments

First, an instantaneous hot water supply system 1 will be described.

Figure 1:
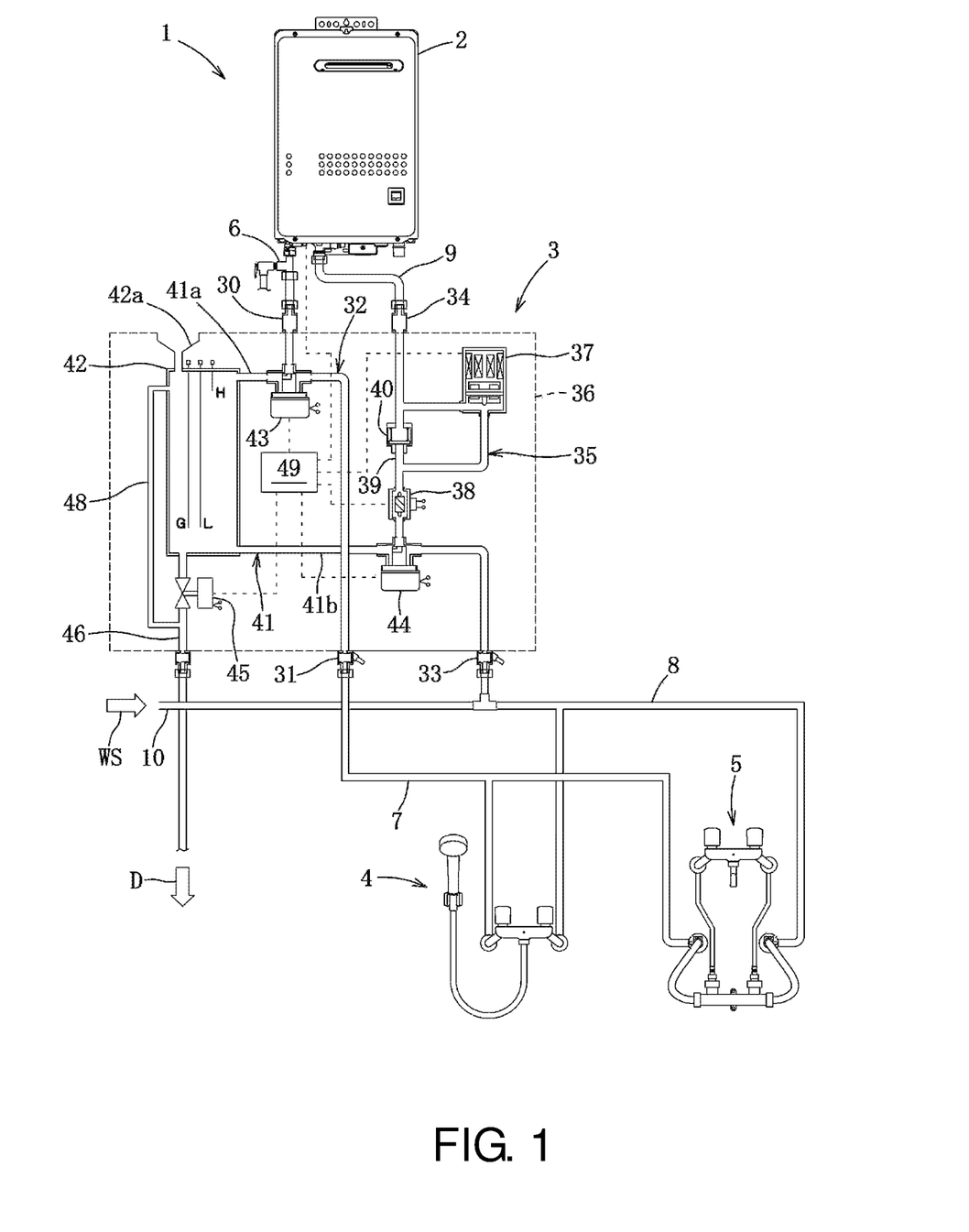
FIG. 1 is a schematic diagram of an instantaneous hot water circulation system including an instantaneous hot water circulation unit with a scale cleaning function according to the disclosure.

As illustrated in FIG. 1, in the instantaneous hot water supply system 1, a hot water supply device 2, an instantaneous hot water circulation unit 3, a hot water supply outgoing pipe 7 and a hot water supply returning pipe 8 are connected to each other to form a hot water circulation passage. One or more external hot water supply units are provided in the circulation passage, for example, a first hot water supply unit 4 is disposed as a shower in a bathroom, and a second hot water supply unit 5 is disposed as a hot water supply faucet of a washstand. Further, a water supply pipe 10 for supplying service water is connected to the hot water supply returning pipe 8. Also, an arrow WS indicates water supply, and an arrow D indicates drainage.

Next, the hot water supply device 2 will be described.

Figure 2:
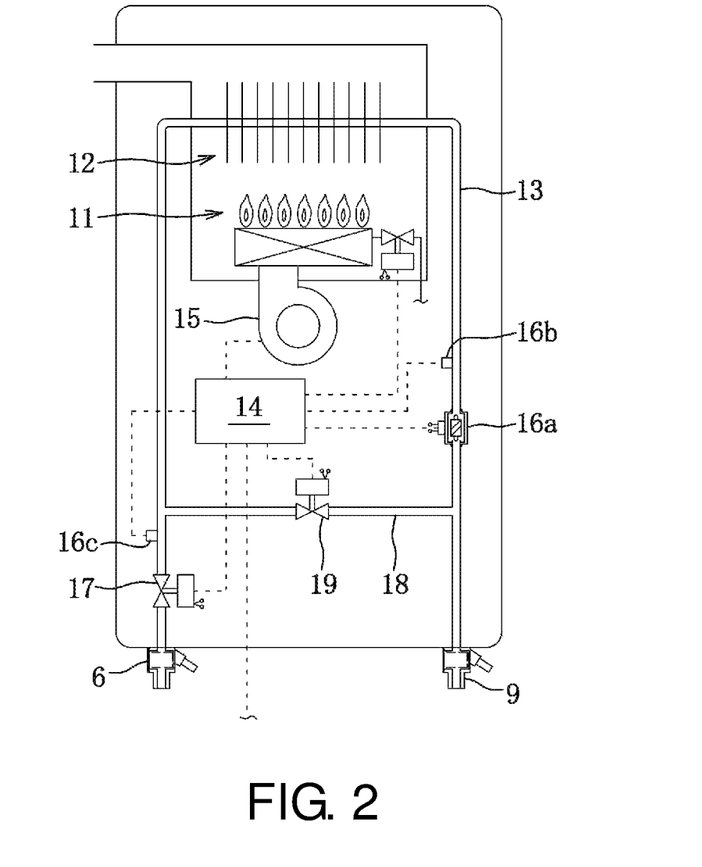
FIG. 2 is a schematic diagram of a hot water supply device according to an embodiment.

As illustrated in FIG. 2, the hot water supply device 2 includes a combustion unit 11, a heat exchanger 12, a heating pipe 13 connected from a water supply unit 9 to a hot water discharge unit 6 via the heat exchanger 12, and a hot water supply controller 14 which controls combustion of the combustion unit 11. The combustion unit 11 mixes air guided from a blower fan 15 with a fuel gas and burns it to generate a high-temperature combustion gas. The heat exchanger 12 heats water by exchanging heat between the combustion gas and the hot water flowing through the heating pipe 13.

A heated water amount sensor 16a which detects an amount of hot water flowing through the heat exchanger 12, an incoming water temperature sensor 16b, a hot water discharge temperature sensor 16c, a hot water discharge control valve 17 which adjusts a hot water discharge amount, and a hot water supply bypass pipe 18 which bypasses the heat exchanger 12 are disposed in heating pipe 13. A hot water supply bypass control valve 19 which adjusts the amount of hot water flowing through the hot water supply bypass pipe 18 is disposed in the hot water supply bypass pipe 18. The hot water supply bypass control valve 19 may adjust a discharge temperature of the hot water by adjusting a mixing ratio of the heated hot water flowing through the heating pipe 13 and the hot water flowing through the hot water supply bypass pipe 18. Also, the heating pipe 13 may not include the hot water supply bypass pipe 18 and the hot water supply bypass control valve 19. In this case, the discharge temperature of the hot water may be adjusted by controlling a combusting state of the combustion unit 11.

The hot water supply controller 14 controls the discharge temperature of the hot water by driving the hot water supply bypass control valve 19 or the blower fan 15 on the basis of an output of the hot water discharge temperature sensor 16c or the like provided in the hot water supply device 2. Although not illustrated, the hot water supply device 2 has an operation unit connected to the hot water supply controller 14 to receive an operation of a user. The operation unit includes an input unit having an input switch or the like, an information display unit, an audio output unit, and so on.

Next, the instantaneous hot water circulation unit 3 will be described

As illustrated in FIG. 1, the instantaneous hot water circulation unit 3 includes a hot water supply inlet portion 30, a hot water supply outlet portion 31, a hot water supply pipe 32 which connects the hot water supply inlet portion 30 with the hot water supply outlet portion 31, a hot water returning unit 33, a hot water outgoing unit 34, and a hot water pipe 35 connecting the hot water returning unit 33 with the hot water outgoing unit 34, and also is accommodated in an exterior case 36.

A circulation pump 37 and a water amount sensor 38 are disposed as a water amount detection unit for detecting the amount of hot water flowing through the hot water pipe 35 in the hot water pipe 35. Further, a hot water bypass pipe 39 bypassing the circulation pump 37 is provided in the hot water pipe 35. A check valve 40 is disposed in the hot water bypass pipe 39.

A bypass pipe 41 branching from the hot water supply pipe 32 and connected to the hot water pipe 35 is provided in the hot water supply pipe 32, and a storage tank 42 is disposed in the middle of the bypass pipe 41. A first three-way valve 43 forming a blocking unit is disposed at a branching portion between the hot water supply pipe 32 and the bypass pipe 41. A merging portion for connecting the bypass pipe 41 with the hot water pipe 35 is located upstream of the branching portion of the hot water bypass pipe 39, and a second three-way valve 44 forming a blocking unit is disposed at the merging portion.

The first three-way valve 43 is switched to the hot water supply pipe 32 side or the bypass pipe 41 side so that a fluid introduced from the hot water supply inlet portion 30 flows through the hot water supply outlet portion 31 or the storage tank 42. The second three-way valve 44 is switched to the hot water pipe 35 side or the bypass pipe 41 side so that the hot water introduced from the hot water returning unit 33 or the fluid in the storage tank 42 flows through the hot water outgoing unit 34.

An upstream pipe portion 41a of the bypass pipe 41 branching from the hot water supply pipe 32 is connected to an upper portion of the storage tank 42. A downstream pipe portion 41b of the bypass pipe 41 connected to the hot water pipe 35 is connected to a lower portion of the storage tank 42. A drain pipe 46 having a drain valve 45 is disposed as a drain portion at a bottom of the storage tank 42. An overflow pipe 48 connected to a portion of the drain pipe 46 on a downstream side of the drain valve 45 from an upper limit position of a stored water level is disposed to discharge the hot water overflowing from the storage tank 42.

An injection port 42a of a cleaning agent used in a cleaning operation for performing pipe cleaning and a plurality of electrodes for detecting the stored water level are disposed in a top surface portion of the storage tank 42. In the exterior case 36, an opening is provided at a position corresponding to the injection port 42a. Although not illustrated, the exterior case 36 may have a lid member capable of closing the opening.

The instantaneous hot water circulation unit 3 includes a circulation controller 49 as a controller and controls the cleaning operation or the like by driving the circulation pump 37, the first three-way valve 43, the second three-way valves 44 or the like in cooperation with the hot water supply controller 14 of the hot water supply device 2. Also, the circulation controller 49 has a timer function and accumulates hot water supply usage amounts detected by the water amount sensor 38 when the circulation pump is not being driven. Further, the hot water supply controller 14 may have the timer function and the hot water supply usage amount accumulating function and may constitute the controller together with the circulation controller 49. Furthermore, the hot water supply controller 14 may have the timer function and the hot water supply usage amount accumulating function and may be formed to control the cleaning operation or the like by driving the circulation pump 37 or the like, and thus the circulation controller 49 may be omitted. The hot water supply usage amounts detected by the heated water amount sensor 16a may be accumulated.

Next, the operation and effects of the instantaneous hot water circulation unit 3 of the disclosure will be described.

Figure 3:
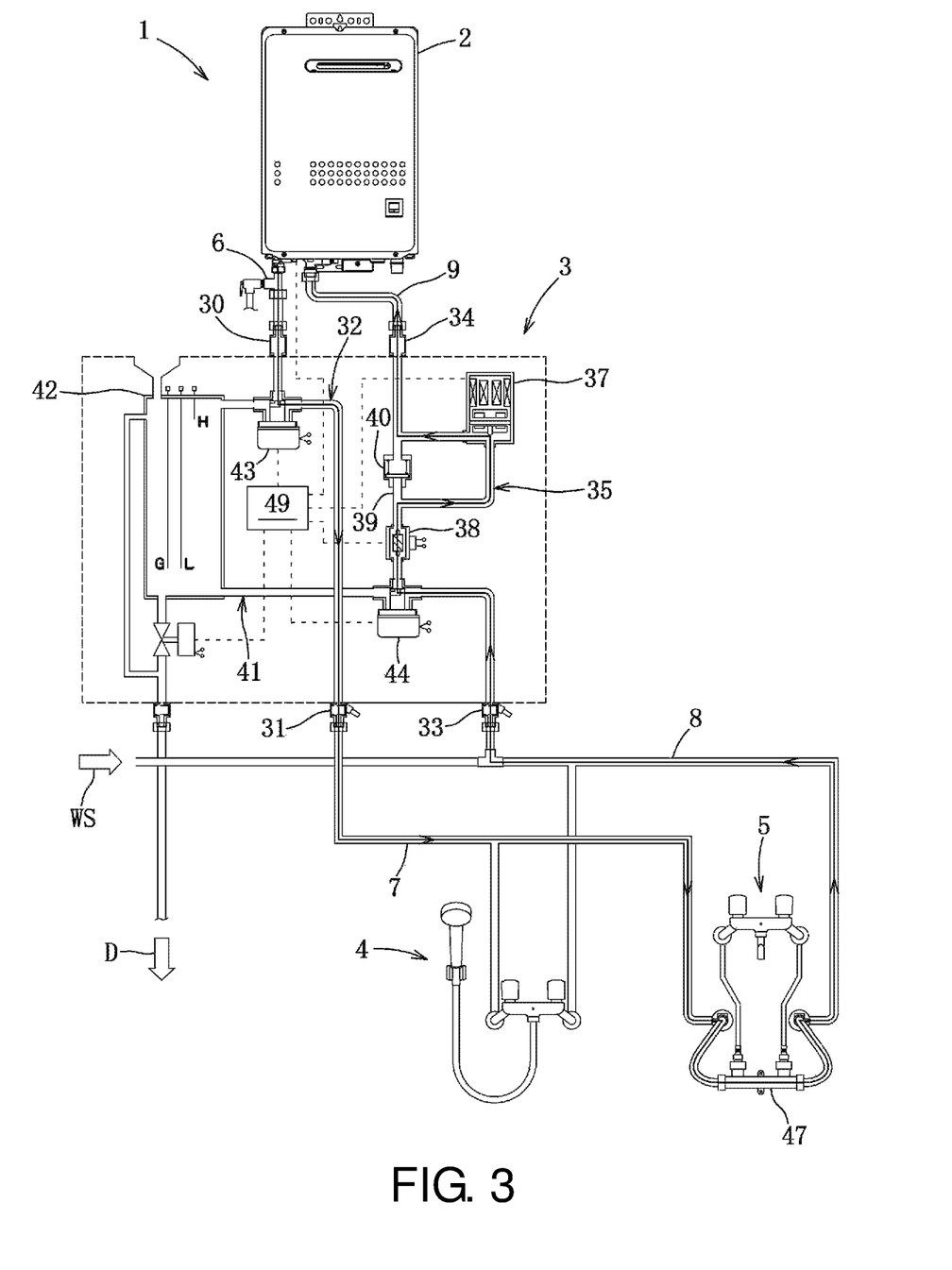
FIG. 3 is a diagram illustrating an instantaneous hot water circulation operation in the instantaneous hot water circulation system of FIG. 1.

As illustrated in FIG. 3, when the hot water supply is stopped and thus the hot water is not supplied from the hot water supply unit, the controller performs an instantaneous hot water circulation operation. In the instantaneous hot water circulation operation, the first three-way valve 43 is switched to the hot water supply pipe 32 side and the second three-way valve 44 is switched to the hot water pipe 35 side so that a flow of the hot water in the bypass pipe 41 is blocked. Further, the circulation pump 37 is driven to circulate the warm water heated by the hot water supply device 2.

By the circulation pump 37 and the first and second three-way valves 43 and 44, the warm water discharged from the hot water supply device 2 can be caused to flow through the hot water supply outgoing pipe 7, and the returning hot water flowing through the hot water supply returning pipe 8 can flow into the hot water supply device 2. A wax thermo valve (not illustrated) is disposed at a connecting portion 47 between the hot water supply outgoing pipe 7 and the hot water supply returning pipe 8. The wax thermo valve is closed to stop the circulation of the hot water when the circulating warm water is equal to or higher than a predetermined temperature.

When the water amount sensor 38 detects a water amount less than a predetermined minimum working water amount due to the closing of the wax thermo valve, energy consumption during an instantaneous hot water circulation operation is minimized by stopping the circulation pump 37 and the combustion of the combustion unit 11. While the circulation is stopped, the circulation pump 37 is intermittently driven to check whether or not the wax thereto valve is open due to a decrease in a temperature of the hot water. When the wax thermo valve opens and the water amount sensor 38 detects an amount of water equal to or larger than the minimum working water amount due to the driving of the circulation pump 37, the combustion of the combustion unit 11 starts, and the instantaneous hot water circulation operation restarts.

Figure 4:
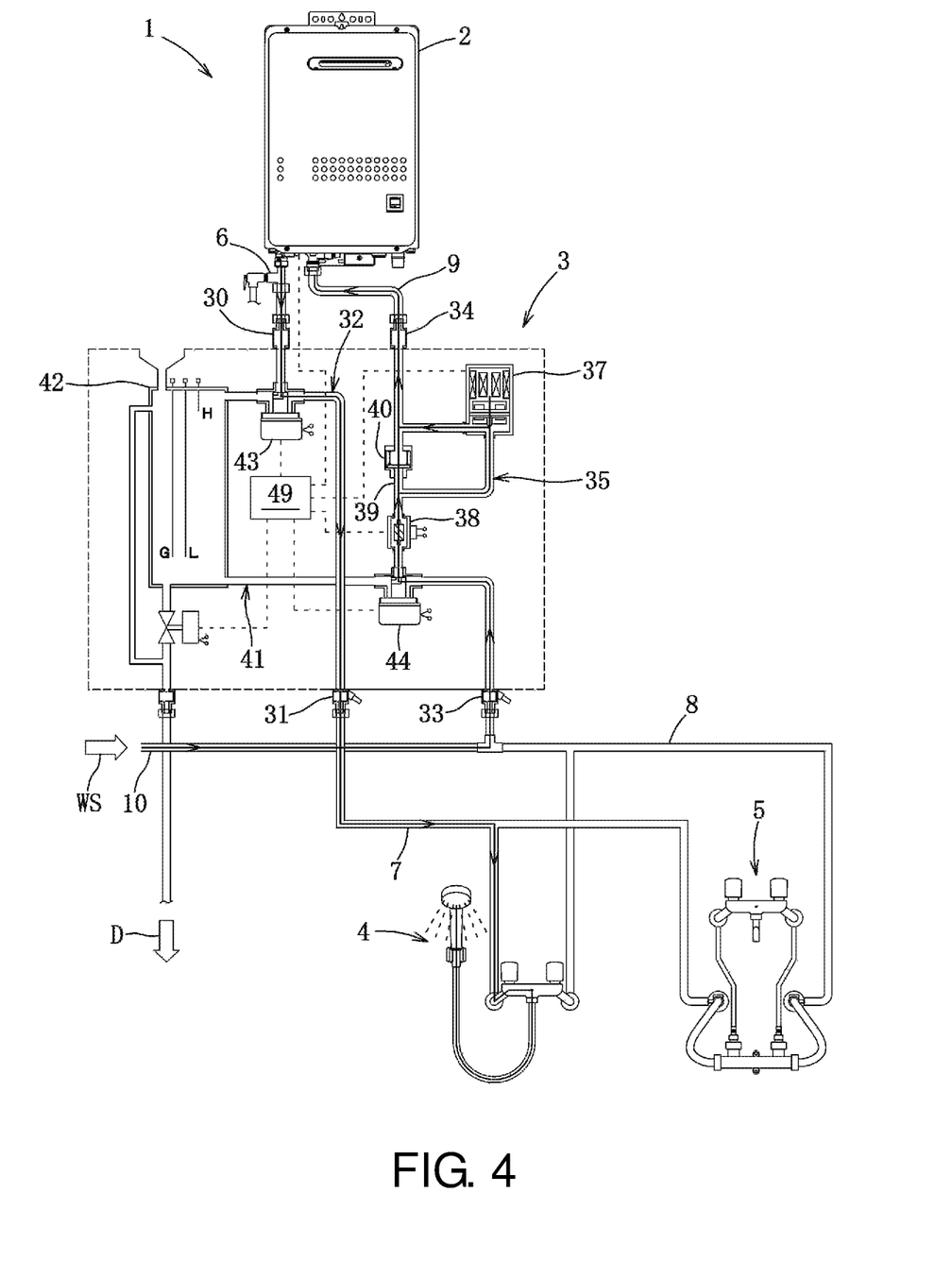
FIG. 4 is a diagram illustrating a hot water supply operation in the instantaneous hot water circulation system of FIG. 1.

As illustrated in FIG. 4, for example, when the hot water supply starts from the first hot water supply unit 4, the warm water in the hot water supply outgoing pipe 7 is supplied. Further, the service water supplied from the water supply pipe 10 flows through the hot water pipe 35 and flows into the hot water supply device 2. The service water is heated by the hot water supply device 2 and becomes the warm water, and this warm water flows through the hot water supply pipe 32 and is supplied to the hot water supply outgoing pipe 7. Therefore, instantaneous hot water supply in which the warm water is discharged immediately after the start of the hot water supply is realized.

During the hot water supply, since the hot water flows due to a supply pressure of the service water, the circulation pump 37 is stopped. At this time, by allowing the service water to flow through the hot water bypass pipe 39, the stopped circulation pump 37 is prevented from becoming water flow resistance and thus preventing the hot water from easily flowing and reducing the discharge amount of the hot water. Incidentally, the circulation pump 37 may be operated to correspond to the hot water supply of a large flow rate.

The controller measures a period from the start of the operation of the instantaneous hot water circulation system or a period from the previous cleaning operation. When a period during which the cleaning operation is not performed exceeds a preset period, or when the accumulated amount of the hot water detected by the water amount detection unit exceeds a preset accumulated amount, the controller starts the cleaning operation. The set period is appropriately set according to hardness (use area) or the like of the service water and is set to a period of, for example, a half year or a year. The set accumulated amount is likewise set appropriately according to the use area or the like. At the start of the cleaning operation, for example, the user is informed to insert the cleaning agent into the storage tank 42 by display or voice from the operation unit.

Figure 5:
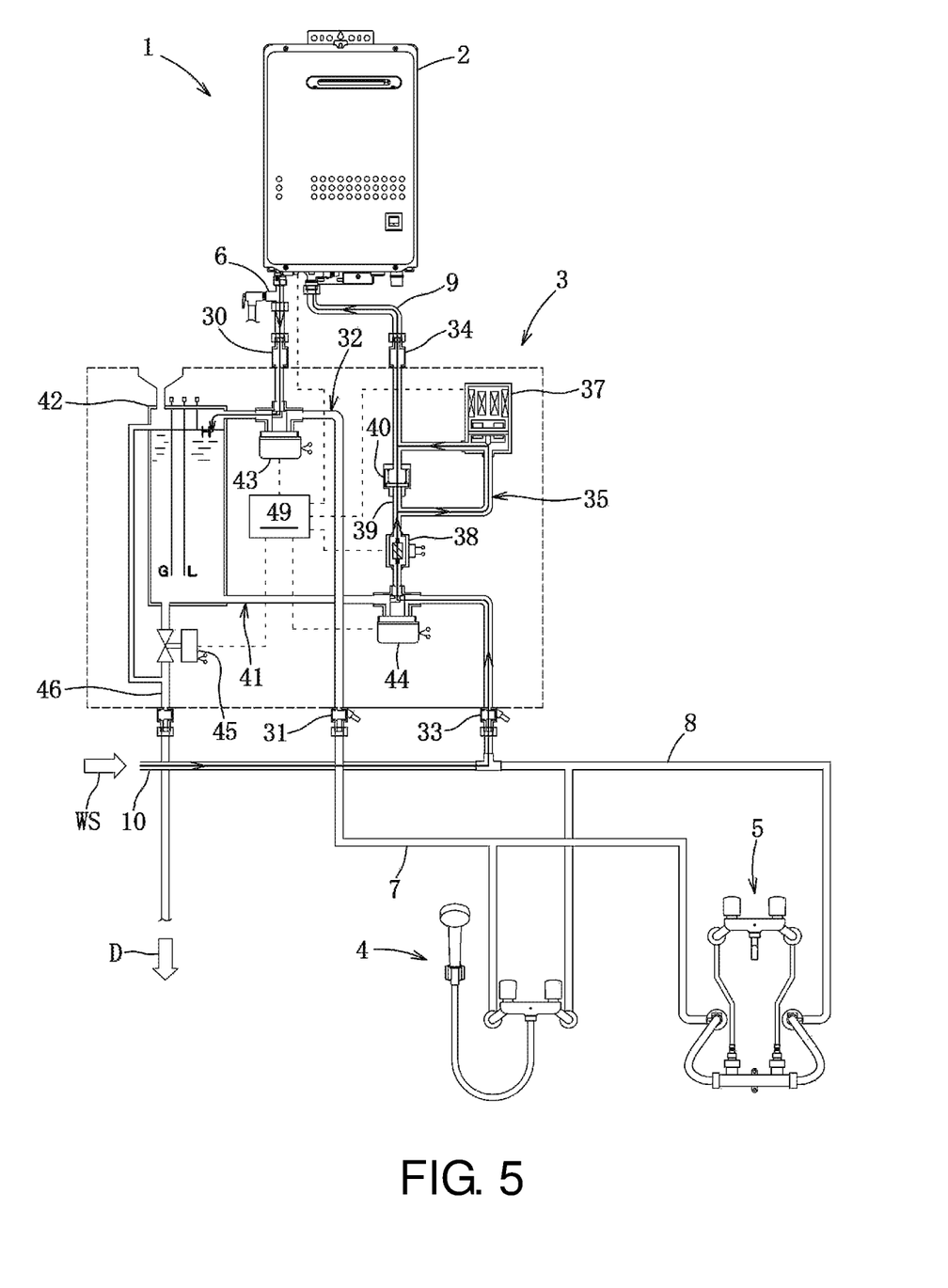
FIG. 5 is a diagram illustrating storage of hot water in a storage tank of the instantaneous hot water circulation system of FIG. 1.

After the cleaning agent is inserted into the storage tank 42, the user inputs completion of an injection of the cleaning agent, for example, by operating the operation unit. After the injection of the cleaning agent, as illustrated in FIG. 5, the controller switches the first three-way valve 43 to the bypass pipe 41 side to block the flow of the hot water at the hot water supply outlet portion 31 and introduces the hot water, for example, to the upper limit of the stored water level of the storage tank 42. The cleaning agent is an acidic agent which dissolves scale and contains citric acid, acetic acid, and so on. Further, the cleaning agent to be injected may be in the form of a tablet or granules, or a liquid may be injected.

Figure 6:
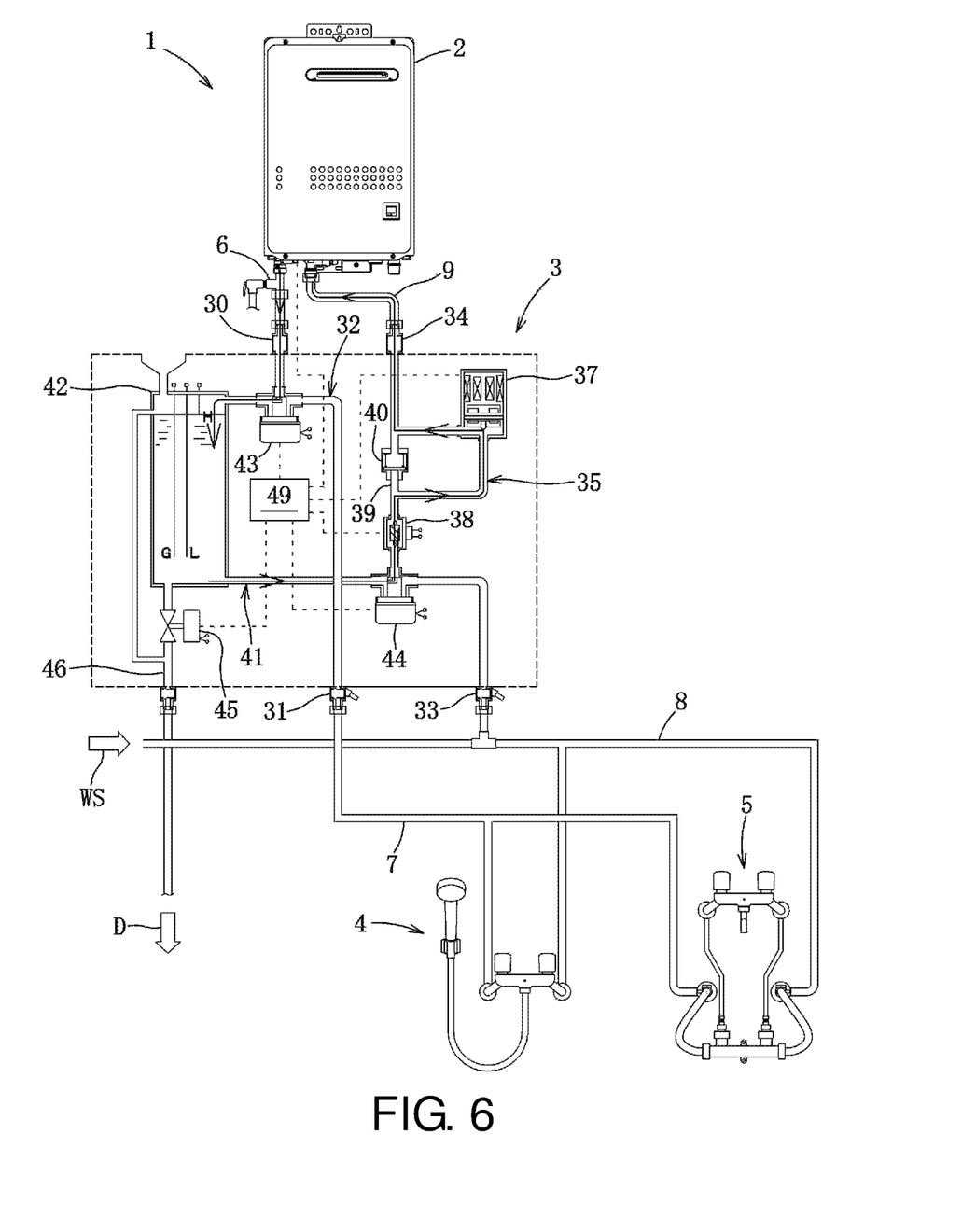
FIG. 6 is a diagram illustrating a cleaning operation by the instantaneous hot water circulation unit illustrated in FIG. 1.

As illustrated in FIG. 6, when the hot water containing the cleaning agent is circulated, the second three-way valve 44 is switched to the bypass pipe 41 side to block the flow of the hot water in the hot water returning unit 33. Also, the first three-way valve 43 maintains a flow blocking state of the hot water supply outlet portion 31. By driving the circulation pump 37 in this state, the cleaning agent in the storage tank 42 flows into the hot water supply device 2, flows through the heating pipe 13 and returns to the storage tank 42. At this time, the hot water supply bypass control valve 19 of the hot water supply device 2 is closed.

When a predetermined time (for example, one hour) elapses after the start of the circulation of the cleaning agent, the circulation pump 37 is stopped, the drain valve 45 is opened, and the cleaning agent is discharged from the drain pipe 46. When discharge of the cleaning agent is completed, the drain valve 45 is closed, and the second three-way valve 44 is switched to the hot water pipe 35 side as illustrated in FIG. 5 to introduce the service water, for example, to the upper limit of the stored water level of the storage tank 42. After that, the second three-way valve 44 is switched to the bypass pipe 41 side, and the drain valve 45 is opened to discharge the introduced service water from the drain pipe 46. The cleaning agent is reliably discharged from an inside of the cleaned pipe by repeating such flushing due to introduction and discharge of the service water a plurality of times (for example, three times).

After completion of the flushing, the second three-way valve 44 is switched to the hot water pipe 35 side to introduce the service water and thus to discharge air in the cleaned pipe to the storage tank 42, the first three-way valve 43 is switched to the hot water supply pipe 32 side to terminate the cleaning operation, and the instantaneous hot water circulation operation starts as illustrated in FIG. 3. Further, it is preferable that the service water stored in the storage tank 42 by the introduction of the service water be discharged from the drain pipe 46.

The instantaneous hot water circulation unit 3 with the cleaning function according to the disclosure circulates the warm water between the hot water supply device 2 and the hot water supply unit during the instantaneous hot water circulation operation and circulates the cleaning agent between the hot water supply device 2 and the instantaneous hot water circulation unit 3 during the cleaning operation. Therefore, it is unnecessary to prepare pipe cleaning equipment for the cleaning operation and to connect the equipment with the hot water supply device 2, and it is possible to easily perform the pipe cleaning by injecting the cleaning agent.

Further, since the blocking unit is provided in the instantaneous hot water circulation unit 3, mixing of the cleaning agent into the hot water for hot water supply during the cleaning operation can be prevented. Therefore, the isolation valve normally disposed in the water supply unit 9 and the hot water discharge unit 6 of the hot water supply device 2 can be omitted.

In addition, since the drain pipe 46 for discharging the cleaning agent is provided, it is possible to reliably discharge the cleaning agent and to prevent the cleaning agent from entering the hot water for hot water supply. Also, since the controller automatically starts the cleaning operation with the elapse of the set period or exceeding of the set accumulated amount, the cleaning operation can start periodically or at a timing when the scale adheres to some extent, and thus breakage due to the scale can be prevented.

Figure 7:
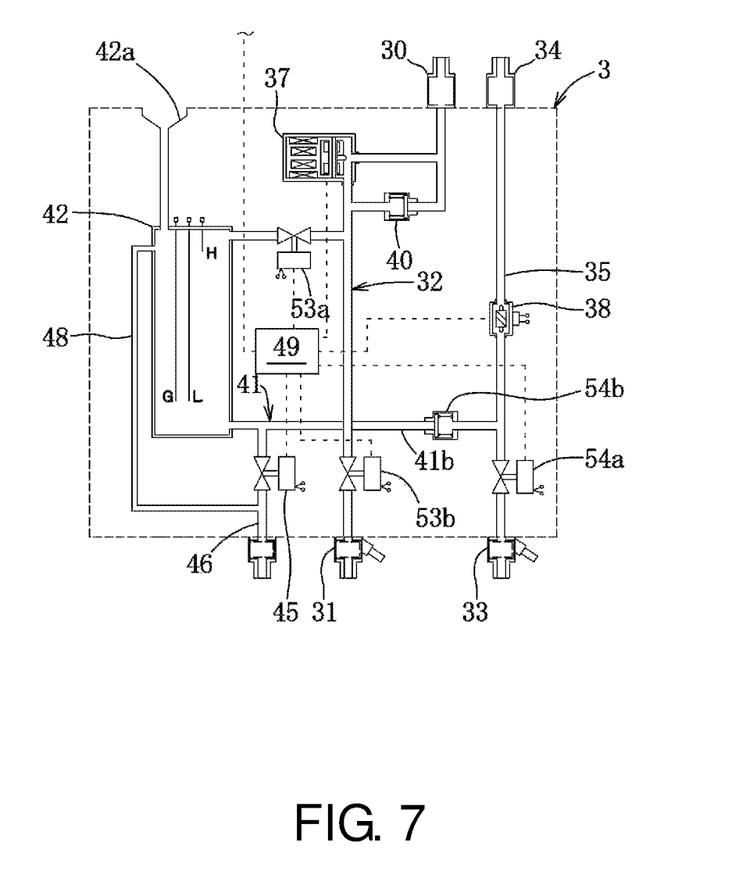
FIG. 7 is a diagram illustrating a modified example of the instantaneous hot water circulation unit.

Next, a modified example in which the above-described embodiment is partially modified will be described with reference to FIG. 7.

[1] The circulation pump 37 of the instantaneous hot water circulation unit 3 may be disposed at a portion of the hot water supply pipe 32 on the upstream side of the branching portion of the bypass pipe 41.

[2] The drain pipe 46 may be disposed in the downstream pipe portion 41b of the bypass pipe 41.

[3] The blocking unit may include servo valves 53a and 53b disposed instead of the first three-way valve 43, and a servo valve 54a and a check valve 54b disposed instead of the second three-way valve 44.

[4] In addition, those skilled in the art can implement the disclosure in such a manner that various modifications are added to the above embodiments without departing from the spirit of the disclosure, and the disclosure includes such modifications.

Due to the above-described first embodiment configuration, since the equipment for pipe cleaning which removes scale is provided in the instantaneous hot water circulation unit which constitutes a hot water supply system, pipe cleaning of the hot water supply device can be easily preformed.

Due to the above-described second embodiment configuration, since it is possible to prevent mixing of the cleaning agent into the hot water for hot water supply, an isolation valve disposed in the water supply unit and the hot water discharge unit of the hot water supply device can be omitted.

Due to the above-described third embodiment configuration, it is possible to reliably discharge the cleaning agent and to prevent the mixing of the cleaning agent into the hot water for hot water supply.

Due to the above-described fourth embodiment configuration, the cleaning operation can start periodically or at a timing when the scale adheres to some extent, and thus breakage due to the scale can be prevented.

According to the disclosure, it is possible to provide an instantaneous hot water circulation unit with a scale cleaning function which can easily perform pipe cleaning for removing scale.

What is claimed is:

1. An instantaneous hot water circulation unit, comprises
   a hot water supply inlet portion connected to a hot water discharge unit of a hot water supply device;
   a hot water supply outlet portion connected to an external hot water supply unit;
   a hot water returning unit configured to introduce returning hot water from the hot water supply unit;
   a hot water outgoing unit connected to a water supply unit of the hot water supply device;
   a hot water supply pipe configured to connect the hot water supply inlet portion with the hot water supply outlet portion;
   a hot water returning pipe configured to connect the hot water returning unit with the hot water outgoing unit;
   a circulation pump provided in the hot water supply pipe or the hot water pipe, and
   a bypass pipe configured to connect the hot water supply pipe and the hot water pipe,
   wherein the instantaneous hot water circulation unit drives the circulation pump to perform an instantaneous hot water circulation operation in which hot water heated by the hot water supply unit is circulated when the hot water supply unit stops hot water supply,
   wherein a storage tank configured to store a cleaning agent used in a cleaning operation of cleaning an inside of the pipe of the hot water supply device is provided at the bypass pipe.

2. The instantaneous hot water circulation unit according to claim 1, wherein a blocking unit configured to prevent the hot water from flowing through the bypass pipe in the instantaneous hot water circulation operation and to prevent the hot water from flowing through the hot water supply outlet portion and the hot water returning unit is provided.

3. The instantaneous hot water circulation unit according to claim 2, wherein a drain portion is provided in the storage tank or the bypass pipe, and when the cleaning operation is completed, the hot water containing the cleaning agent is discharged from the drain portion.

4. The instantaneous hot water circulation unit according to claim 3, comprising a controller configured to control the cleaning operation and a water amount detection unit configured to detect a hot water supply usage amount,
wherein the controller automatically starts the cleaning operation when a period during which the cleaning operation is not performed exceeds a preset period or when an accumulated amount of the hot water supply usage amount detected by the water amount detection unit exceeds a preset accumulated amount.

5. The instantaneous hot water circulation unit according to claim 2, comprising a controller configured to control the cleaning operation and a water amount detection unit configured to detect a hot water supply usage amount,
wherein the controller automatically starts the cleaning operation when a period during which the cleaning operation is not performed exceeds a preset period or when an accumulated amount of the hot water supply usage amount detected by the water amount detection unit exceeds a preset accumulated amount.

6. The instantaneous hot water circulation unit according to claim 1, wherein a drain portion is provided in the storage tank or the bypass pipe, and when the cleaning operation is completed, the hot water containing the cleaning agent is discharged from the drain portion.

7. The instantaneous hot water circulation unit according to claim 6, comprising a controller configured to control the cleaning operation and a water amount detection unit configured to detect a hot water supply usage amount,
wherein the controller automatically starts the cleaning operation when a period during which the cleaning operation is not performed exceeds a preset period or when an accumulated amount of the hot water supply usage amount detected by the water amount detection unit exceeds a preset accumulated amount.

8. The instantaneous hot water circulation unit according to claim 1, comprising a controller configured to control the cleaning operation and a water amount detection unit configured to detect a hot water supply usage amount,
wherein the controller automatically starts the cleaning operation when a period during which the cleaning operation is not performed exceeds a preset period or when an accumulated amount of the hot water supply usage amount detected by the water amount detection unit exceeds a preset accumulated amount.

\* \* \* \* \*